United States Patent Office 2,832,787
Patented Apr. 29, 1958

2,832,787
OXADIAZOLE DERIVATIVES

Jack Bernstein and Harry Louis Yale, New Brunswick, N. J., assignors to Olin Mathieson Chemical Corporation, New York, N. Y., a corporation of Virginia No Drawing. Application February 6, 1957
Serial No. 638,442

10 Claims. (Cl. 260—307)

This invention relates to new compounds and, more particularly, to compounds selected from the class consisting of oxadiazoles of the general formula

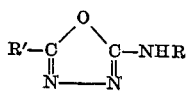

and acid-addition salts thereof, wherein R is hydrogen or acyl and R' is aralkyl (preferably a hydrocarbon aralkyl of less than 15 carbon atoms, as exemplified by benzyl, phenethyl, α-phenylpropyl, benzhydryl and α-ethylbenzyl).

The compounds of this invention are effective as skeletal muscle-relaxants, tranquilizing agents and especially antiepileptic agents. Thus, they may be used in the prevention of epileptic seizures, both of the grand mal and petit mal type. For this purpose, they are administered perorally in a daily dosage of less than about 5 grams.

Exemplary compounds within the scope of this invention include: 5-(hydrocarbon aryl-lower alkyl)-2-amino-1,3,4-oxadiazoles [e. g., 5-(α-ethylbenzyl)-2-amino-1,3,4-oxadiazole and particularly 5-diphenylmethyl-2-amino-1,3,4-oxadiazole]; the acid-addition salts of the foregoing (particularly the acid-addition salts with strong mineral acids, such as hydrochloric, sulfuric and nitric acid); and the 2-N-acyl derivatives thereof [particularly carboxylic acid amides, such as the alkanoic acid amides, as exemplified by 5-benzhydryl-2-acetamido-1,3,4-oxadiazole, 5-(α-ethylbenzyl) - 2 - laurylamido - 1,3,4 - oxadiazole and 5-benzhydryl-2-isovaleramido-1,3,4-oxadiazole].

These compounds are prepared by heating a 1-substituted-3-thiosemicarbazide of the formula

R'—CO—NHNHCSNH$_2$ with lead oxide and recovering the resultant 5-R'-substituted-2-amino-1,3,4-oxadiazole. The free base, thus formed, can then, if desired, be converted to a 2-amido derivative by heating with an acylating agent, preferably either an acyl halide or acid anhydride (e. g., an alkanoic acid anhydride such as acetic anhydride or an alkanoyl chloride such as lauryl chloride), or to its acid-addition salts by treatment with the desired acid.

The following examples illustrate the invention:

EXAMPLE 1

2-amino-5-(α-ethylbenzyl)-1,3,4-oxadiazole (a) *1-(α-phenylbutyryl) - 3 - thiosemicarbazide.*—To 27.3 g. of finely powdered thiosemicarbazide in 300 ml. of dry pyridine at 0° C. is added dropwise 54.8 g. of α-phenylbutyryl chloride. The mixture is kept overnight, diluted with 700 ml. of water and concentrated in vacuo. The product separates as an oil which soon solidifies. The yield of 1-(α-phenylbutyryl)-3-thiosemicarbazide is about 25.3 g., M. P. approximately 166–168° C.

(b) *2-amino - 5 - (α - ethylbenzyl)-1,3,4-oxadiazole.*— A mixture of 5.8 g. of 1-(α-phenylbutyryl)-3-thiosemicarbazide, 41.7 g. of Pb$_3$O$_4$ and 250 ml. of 95% ethanol is stirred and refluxed for 24 hours, filtered hot and the filtrate concentrated to give about 4 g. of 2-amino-5-(α-ethylbenzyl)-1,3,4-oxadiazole, M. P. about 195–196° C.

EXAMPLE 2

2-amino-5-benzhydryl-1,3,4-oxadiazole

By substituting 7.4 g. of diphenylacetyl chloride for the α-phenylbutyryl chloride in the process of Example 1(a), about 3 g. of 2-amino-5-benzhydryl-1,3,4-oxadiazole, M. P. about 211–212° C., is obtained.

EXAMPLE 3

2-amino-5-(α-ethylbenzyl)-1,3,4-oxadiazole hydrochloride

To 4 g. of 2-amino-5-(α-ethylbenzyl)-1,3,4-oxadiazole in an acetone solution is added an equivalent amount of ethanolic hydrogen chloride. The solution thus formed is diluted with dry ether to give 2-amino-5-(α-ethylbenzyl)-1,3,4-oxadiazole hydrochloride, M. P. about 134–135° C.

EXAMPLE 4

2-acetamido-5-benzhydryl-1,3,4-oxadiazole 10 g. of 2-amino-5-benzhydryl-1,3,4-oxadiazole and 25 ml. of acetic anhydride is refluxed for one hour and the mixture allowed to cool. The solid which crystallizes is filtered to give about 9.5 g. of 2-acetamido-5-benzhydryl-1,3,4-oxadiazole.

EXAMPLE 5

2-acetamido-5-(α-ethylbenzyl)-1,3,4-oxadiazole

By substituting 10 g. of 2-amino-5-(α-ethylbenzyl)-1,3,4-oxadiazole for the 2-amino-5-benzhydryl-1,3,4-oxadiazole in the procedure of Example 4, 2-acetamido-5-(α-ethylbenzyl)-1,3,4-oxadiazole is obtained.

In a similar manner, other 2-acylated derivatives can be produced. Thus, by substituting propionic anhydride or lauryl chloride for the acetic anhydride in the procedure of either Example 4 or 5, the respective 2-propionyl and 2-lauryl derivatives are obtained.

The invention may be variously otherwise embodied within the scope of the appended claims.

We claim:

1. A compound selected from the class consisting of oxadiazoles of the general formula

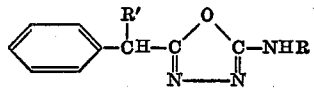

and acid-addition salts thereof, wherein R is selected from the group consisting of hydrogen and a fatty carboxylic acyl radical, and R' is selected from the group consisting of phenyl and lower alkyl.

2. 5-[α-(lower alkyl)benzyl] - 2 - amino-1,3,4-oxadiazole.

3. An acid-addition salt of 5-[α-(lower alkyl)benzyl]-2-amino-1,3,4-oxadiazole.

4. 2-alkanoylamino-5-benzhydryl-1,3,4-oxadiazole.

5. 2-alkanoylamino - 5 - [α-(lower alkyl)benzyl]-1,3,4-oxadiazole.

6. 2-amino-5-benzhydryl-1,3,4-oxadiazole.

7. 2-amino-5-(α-ethylbenzyl)-1,3,4-oxadiazole.

8. 2-amino-5-(α - ethylbenzyl)-1,3,4-oxadiazole hydrochloride.

9. 2-acetamido-5-benzhydryl-1,3,4-oxadiazole.

10. 2-acetamido-5-(α-ethylbenzyl)-1,3,4-oxadiazole.

References Cited in the file of this patent

Valenti et al.: Chem. Abstracts, vol. 46, col. 11186 (1952).